United States Patent [19]

Hays et al.

[11] Patent Number: 5,929,344

[45] Date of Patent: Jul. 27, 1999

[54] CIRCUITRY FOR REDUCING THE NUMBER OF CONDUCTORS FOR MULTIPLE RESISTIVE SENSORS ON A CORIOLIS EFFECT MASS FLOWMETER

[75] Inventors: Paul J. Hays, Louisville; Michael J. Zolock, Longmont, both of Colo.

[73] Assignee: Micro Motion, Inc., Boulder, Colo.

[21] Appl. No.: 08/901,686

[22] Filed: Jul. 28, 1997

[51] Int. Cl.$^6$ ........................................ G01F 1/84
[52] U.S. Cl. .................. 73/861.357; 73/861.356; 374/183
[58] Field of Search ............... 73/861.356, 861.357, 73/32 R; 374/172, 183

[56] References Cited

U.S. PATENT DOCUMENTS

| | | | |
|---|---|---|---|
| 3,913,403 | 10/1975 | Arcara | 374/183 |
| 4,201,088 | 5/1980 | Trietley | 374/172 |
| 4,294,116 | 10/1981 | Yamamura et al. | 374/172 |
| 5,171,091 | 12/1992 | Kruger et al. | |
| 5,317,520 | 5/1994 | Castle | 374/172 |
| 5,381,697 | 1/1995 | van der Pol | |

FOREIGN PATENT DOCUMENTS

| | | |
|---|---|---|
| 0 187 317 A1 | 7/1986 | European Pat. Off. |
| 0 364 054 A2 | 4/1990 | European Pat. Off. |

*Primary Examiner*—Harshad Patel
*Attorney, Agent, or Firm*—Duft, Graziano & Forest, P.C.

[57] ABSTRACT

A circuit for utilizing multiple resistive sensors and in particular resistive temperature sensors while minimizing the number of conductors necessary to measure the multiple sensors. The multiple sensors are connected in series and the voltage is measured at each node in the series connection of sensors. A switching device then opens to remove one of the sensors from the voltage supply allowing a measurement to be made of the resistance of the conductor between the temperature sensors and a remote transmitter. The measured sensor resistances are then compensated with the measured conductor resistance to obtain a conductor-length compensated resistance for each of the multiple resistive sensors.

15 Claims, 5 Drawing Sheets

CIRCUITRY FOR REDUCING THE NUMBER OF CONDUCTORS FOR MULTIPLE RESISTIVE SENSORS ON A CORIOLIS EFFECT MASS FLOWMETER

FIELD OF THE INVENTION

This invention relates to an apparatus for using more than one resistive sensor on a Coriolis mass flowmeter. More particularly, the invention relates to a circuit for using more than one temperature sensor on a Coriolis mass flowmeter while minimizing the number of conductors necessary between the flowmeter element and the flowmeter transmitter.

STATEMENT OF THE PROBLEM

It is known to use Coriolis effect mass flowmeters to measure mass flow and other information of materials flowing through a pipeline as disclosed in U.S. Pat. Nos. 4,491,025 issued to J. E. Smith, et al. of Jan. 1, 1985 and Re. 31,450 to J. E. Smith of Feb. 11, 1982. These flowmeters have one or more flow tubes of a curved or straight configuration. Each flow tube configuration in a Coriolis mass flowmeter has a set of natural vibration modes, which may be of a bending, torsional, radial or coupled type. Each flow tube is driven to oscillate at resonance in one or more of these natural modes. The natural vibration modes of the vibrating, material filled system are defined in part by the combined mass of the flow tubes and the material within the flow tubes. Material flows into the flowmeter from a connected pipeline on the inlet side of the flowmeter. The material is then directed through the flow tube or flow tubes and exits the flowmeter to a pipeline connected on the outlet side.

A driver applies force to oscillate the flow tube. When there is no flow through the flowmeter, all points along a flow tube oscillate with identical phase. As the material begins to flow, Coriolis accelerations cause each point along the flow tube to have a different phase with respect to other points along the flow tube. The phase on the inlet side of the flow tube lags the driver, while the phase on the outlet side leads the driver. Pick-off sensors are placed on the flow tube to produce sinusoidal signals representative of the motion of the flow tube. Pick-off sensors may be position, velocity or acceleration sensors. The phase difference between the two pick-off sensor signals is proportional to the mass flow rate of the material flowing through the flow tube or flow tubes.

Fluid flow though a flow tube creates only a slight phase difference on the order of several degrees between the inlet and outlet ends of an oscillating flow tube. When expressed in terms of a time difference measurement, the phase difference induced by fluid flow is on the order of tens of microseconds down to nanoseconds. Typically, a commercial flow rate measurement should have an error of less the 0.1%. Therefore, a Coriolis flowmeter must be uniquely designed to accurately measure these slight phase differences.

The vibrational characteristics of the vibrating structure of a Coriolis flowmeter change with changes in temperature. The vibrating flow tube(s) are typically formed from metallic material having a Young's modulus that changes with temperature. In order to maintain a high measurement accuracy the temperature of the vibrating structure is typically measured and a compensation is made for the change in Young's modulus with changes in temperatures.

A Coriolis flowmeter system is comprised of two components; a flowmeter element and a transmitter. The flowmeter element is the actual sensor, containing vibrating tube(s), through which fluid flows while the transmitter is the signal processing device that receives and processes signals from the flowmeter element. Electrical connections between the flowmeter element and the transmitter are made over a multi-conductor cable. The shielded cable is comprised of a shielded conductor pair for providing a drive signal to the driver, second and third shielded conductor pairs for transmitting signals from the pick-off sensors and a shielded conductor triplet for transmitting a signal from a temperature sensor located on the vibrating flow tube. A three wire temperature sensor is typically used since this allows for a compensation of the resistance in the cable between the flowmeter element and the flowmeter transistor. This 9-wire cable is not a standard cable in the process control industry. Thus each time a Coriolis flowmeter is installed using a transmitter mounted remotely from the flowmeter element, a special, non-standard cable (the 9-wire Coriolis flowmeter cable) must be run between the flowmeter element and the transmitter. This creates additional expense for the user of the Coriolis flowmeter.

As Coriolis flowmeter technology develops, performance demands and changes to the geometry of the vibrating flow tube(s) has brought about a need to make temperature measurements at multiple points on the flowmeter element. A temperature measurement of the vibrating structure, e.g. flow tube(s), and a temperature measurement of the non-vibrating structure might be necessary. Alternatively a temperature measurement of a wetted portion of the vibrating structure and a temperature measurement of a non-wetted portion of the vibrating structure might be necessary. In any event, when more than one temperature sensor is used in existing Coriolis flowmeter designs, conductors in addition to those available in the typical 9-wire cable used with Coriolis flowmeters are required. A cable having more than the traditional 9 conductors is a problem for several reasons. One reason is that even the existing 9-wire cable is expensive. Using a cable with even more conductors adds additional expense for the users of Coriolis flowmeters. Therefore whatever number of temperature sensors are employed in a given flowmeter it is advantageous to minimize the number of conductors. For the manufacturers of Coriolis flowmeters, additional conductors in the cable also means additional connectors on both the flowmeter element and the transmitter. This adds additional cost to the product and can also pose problems if there is not enough physical space for the additional connectors. This is particularly true for intrinsically safe applications. Another reason why adding additional conductors to the cable is a problem is one of compatibility. Manufactures of Coriolis mass flowmeters would incur additional expense and complexity if different types of flowmeter models required different cables. Also, there exists a large installed base of Coriolis flowmeters using 9-wire cables within which new flowmeter designs could easily be applied to replace old flowmeters if the same cable could be used.

There exists a need for a Coriolis flowmeter design that provides for multiple temperature sensors while minimizing the number of conductors between the flowmeter element and the transmitter. There exists a further need for a Coriolis flowmeter employing two temperature sensors that utilizes the existing 9-wire cable typically used with Coriolis flowmeters.

STATEMENT OF THE SOLUTION

The above and other problems are solved by the method and apparatus of the present invention that comprises multiple temperature sensors in series. Each temperature sensor provides a separate temperature reading and a measurement is also made of the cable resistance to allow for a cable resistance compensation. One of the temperature sensors is periodically switched out of series with the other temperature sensors and a measurement is made of the cable resistance. When the present invention is used with two temperature sensors, the same 9-wire cable used by existing single temperature sensor designs is used to measure two temperatures. When the present invention is used with more than two temperature sensors a minimum number of conductors are required as compared to existing Coriolis flowmeter designs.

Existing Coriolis flowmeter designs require one conductor for each terminal of a resistive temperature sensor and at least one additional conductor so that the cable resistance can be measured and compensated. According to the present invention, multiple temperature sensors are connected in series and only the node points of the serial connection require conductors. No additional conductor is used to measure the cable resistance. One of the temperature sensors is periodically switched out of the series connection so that no current flows through that temperature sensor. A measurement of the voltage across one conductor by itself is then possible thereby providing a measure of the cable resistance.

Multiple temperature sensors are arranged in series. The number of conductors required (for temperature measurement) between the flowmeter element (where the temperature sensors are located) and the transmitter is equal to 1 plus the number of temperature sensors. A switching device located at the transmitter is operable for disconnecting one end of the series connection of temperature sensors from the power supply of the transmitter. This ensures that no current flows through the temperature sensor at the disconnected end of the series connection. Thus the voltage measured at the transmitter across the disconnected temperature sensor as compared to the voltage measured at the transmitter across a reference resistance provides a measure of the resistance in the conductor between the transmitter and the disconnected temperature sensor. This cable resistance is then subtracted from the resistance measurements received from the temperature sensors. The resistance of the conductors between the transmitter and the flowmeter element changes with temperature. In an environment where the temperature does not change rapidly the cable resistance measurement can be made infrequently, e.g. every 10 minutes. In an environment where the temperature does change rapidly the cable resistance measurement can be made more frequently, e.g. every 30 seconds. Although only the resistance of a single conductor is measured, all the conductors are of the same length and same gauge and are bundled in the same cable. Thus the resistance of one conductor is similar if not identical to the other cable conductors.

The present invention provides multiple temperature measurements with cable length compensation using the minimum number of conductors. In the case of two temperature sensors only three conductors are necessary to make two separate temperature measurements and compensate for cable length. Thus existing 9-wire cable used extensively with Coriolis mass flowmeters can accommodate two temperature measurements.

DETAILED DESCRIPTION

Figure 1:
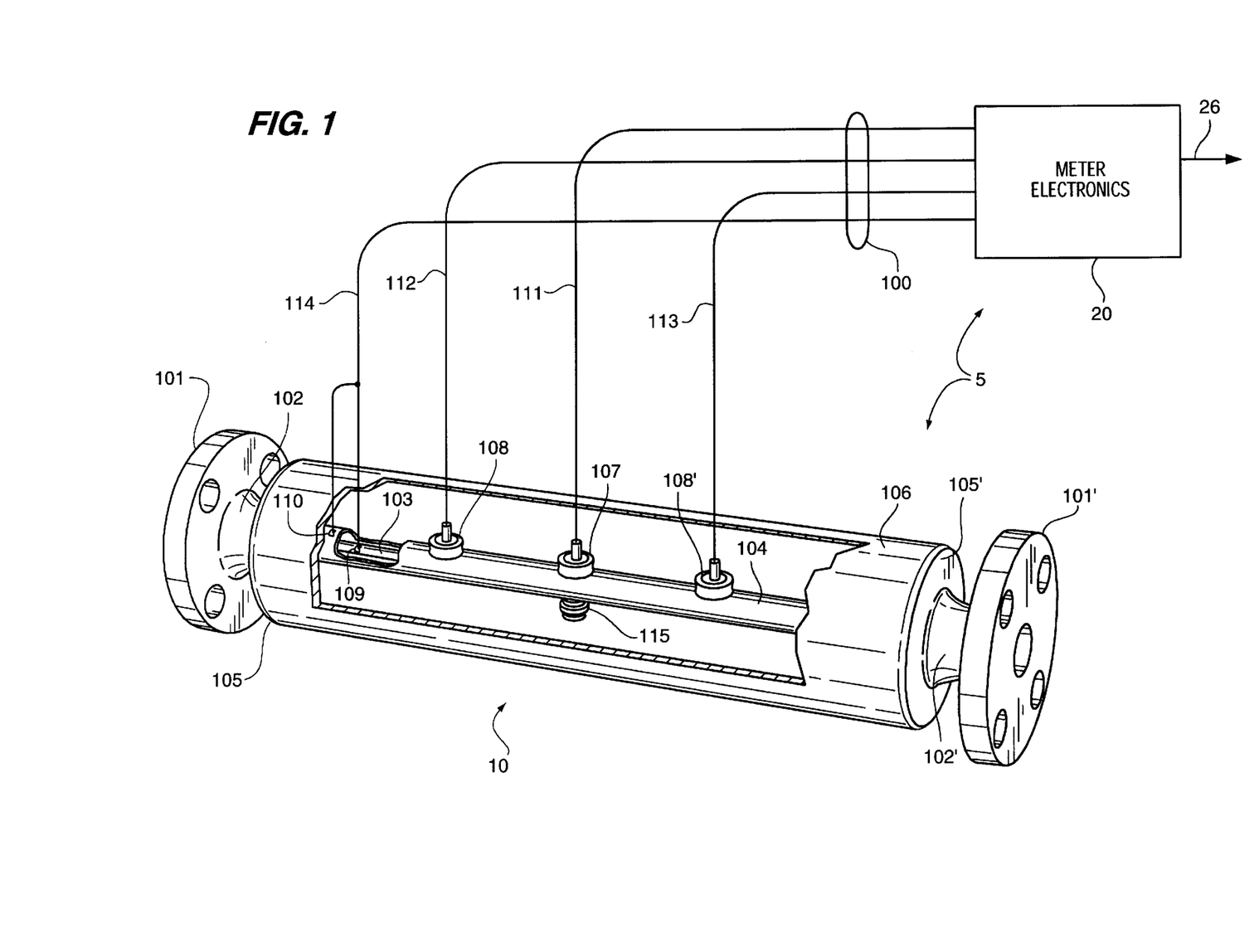
FIG. 1 is a cross-section of a straight-tube Coriolis mass flow system employing dual temperature sensors.

Coriolis Flowmeter System in General—FIG. 1

FIG. 1 shows a Coriolis flowmeter system 5 comprising a Coriolis meter element 10 and transmitter 20. Transmitter 20 is connected to meter assembly 10 via multi-conductor cable 100. Transmitter 20 provides density, mass flow rate, volume flow rate and temperature data over path 26 to a utilization means (not shown). A Coriolis flowmeter structure is described although it is apparent to those skilled in the art that the present invention could be practiced in conjunction with a vibrating tube densimeter without the additional measurement capability provided by a Coriolis mass flowmeter.

Meter element 10 includes a pair of flanges 101 and 101', manifolds 102 and 102'. Fluid enters meter element 10 through one of flanges 101 or 101' and passes through flow tube 103 leaving flow element 10 through the other flanges 101 or 101'. Flow tube 103 is encircled by balance tube 104. Flow tube 103 is connected to balance tube 104 and balance tube 104 is connected to case ends 105 and 105'. Case ends 105 and 105' form the end of case 106. FIG. 1 illustrates a straight flow tube 103. Those skilled in the art recognize that the present invention can be applied to a flowmeter system having a flow tube of any geometry. Also, a flow element having multiple flow tubes through which fluid flows is clearly within the scope of the present invention.

Driver 107 is connected to balance tube 104 at the mid-point of balance tube 104. Pick-off sensors 108 and 108' are connected to balance tube 104 and flow tube 103. In one embodiment of the present invention, each of pick-off sensors 108 and 108' comprises a coil attached to balance tube 104 and a magnet attached to flow tube 103 and formed to move within the magnetic field generated when a periodic signal is applied to the coil. Those skilled in the art recognize that pick-off sensors of any design, e.g., accelerometers or potentiometers, could be used and that the velocity sensors described are merely exemplary.

Counter-balance 115 is connected to balance tube 104 diametrically opposite of driver 107. The mass of counter-balance 115 is determined by the density of the expected process fluid to be measured by system 5. Flow tube temperature sensor 109 is attached to flow tube 103 and balance tube temperature sensor 110 is attached to balance tube 104.

Cable 100 is comprised of conductor 111 which carries the drive signal from transmitter 20 to driver 107, conductors 112–113 which carry the pick-off signals from left and right pick-off sensors to transmitter 20, respectively, and conductor 114 which carries temperature sensor information to transmitter 20. Conductors 111–113 are actually two conductor each and conductor 114 is actually three separate conductors meaning that cable 100 comprises 9 conductors.

The operation of transmitter 20 to produce mass flow rate, volume flow rate and density information is well known to those skilled in the art of flow measurement and does not form part of the present invention. The circuitry including flow tube temperature sensor 109, balance tube temperature sensor 110, conductor 114 and the associated circuitry within transmitter 20 form the basis for the remaining description.

It is known to those skilled in the art that Coriolis flowmeter system 5 is quite similar in structure to a vibrating tube densitometer. Vibrating tube densitometers also utilize a vibrating tube through which fluid flows or, in the case of a sample-type densitometer, within which fluid is held. Vibrating tube densitometers also employ a drive system for exciting the flow tube to vibrate. Vibrating tube densitometers typically utilize only a single feedback signal, i.e., from a single pick-off, since a density measurement requires only the measurement of frequency and a phase measurement is not necessary. The descriptions of the present invention herein apply equally to vibrating tube densitometers.

Figure 2:
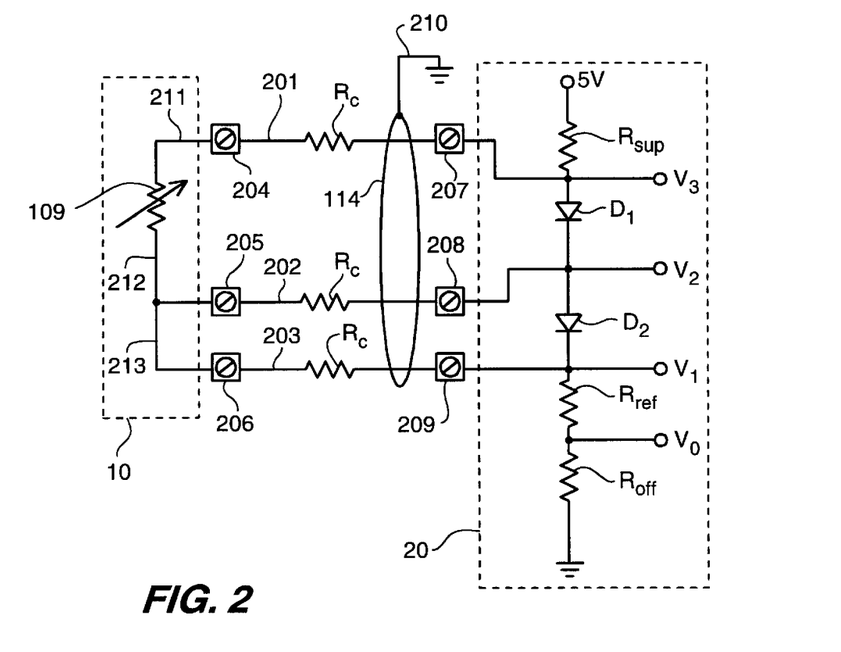
FIG. 2 is a schematic of one example implementation for a single temperature sensor circuit as used in known Coriolis mass flow systems.

Single Temperature Sensor—FIG. 2

FIG. 2 is a schematic for a known temperature measurement circuit. FIG. 2 illustrates a circuit for measuring temperature at flowmeter element 10 using a single temperature sensor 109. With reference to FIG. 1, FIG. 2 is a schematic showing the necessary wiring for utilizing only flow tube temperature sensor 109. Conductor 114, which is part of cable 100, is comprised of three conductors 201–203. Conductor 114 has a shield grounded over path 210. The three wires 211–213 of temperature sensor 109 are connected to three terminals 204–206 on flowmeter element 10. Conductors 201–203 are connected to terminals 204–206 at one end and to terminals 207–209 on transmitter 20 at their respective other ends. Each of conductors 201–203 have a conductor resistance modeled as resistance $R_C$ on each of conductors 201–203. Conductors 201–203 are substantially equal in length and gauge thus their respective resistances are represented as being equal. Although the resistance $R_C$ in each of conductors 201–203 is equal, resistance $R_C$ is not fixed. The value of resistance $R_C$ is determined by the length of cable 100 and the temperature of cable 100. For a given installation, the length of cable 100 is fixed although it is rarely, if ever, known at the time the flowmeter system 5 is calibrated at the factory. Temperature, however, varies over time in a given installation. Thus the value of resistance $R_C$ changes and must be compensated for in the measurement of temperature with temperature sensor 109.

A voltage is applied by the voltage reference through supply resistor $R_{sup}$. In this example, a 5V voltage reference is shown although any voltage reference could be used. Resistor $R_{sup}$, reference resistor $R_{ref}$ and offset resistor $R_{off}$ are selected so that a voltage $(V_3–V_2)$ across a normally operating temperature sensor 109 will not exceed the cut-in voltage of diode $D_1$. Likewise, for diode $D_2$. Temperature sensor 109 represents a typical three-wire resistive temperature detector. The temperature experienced by temperature sensor 109 is measured by determining the resistance of temperature sensor 109, compensating that resistance for the resistance Rc and plugging that resistance value into a standard equation, all as discussed below.

The following equation illustrates the measurements made in existing Coriolis flowmeter systems to measure the resistance of temperature sensor 109.

$$\frac{(V_3 - V_2) - (V_2 - V_1)}{V_1 - V_0} * R_{REF}\ (\Omega) = RTD\ \Omega \quad \text{(EQN. 1)}$$

EQN. 1 represents the difference between the voltage across temperature sensor 109 ($V_3–V_2$) and the voltage across the resistance Rc ($V_2–V_1$). The typical Resistive Temperature Device is a "100 Ohm ($\Omega$) resistor". A 100$\Omega$RTD is measured by comparing the resistance of the RTD (temperature sensor 109) to a 100$\Omega$ reference resistor ($R_{ref}$). Once the resistance of the RTD is known, the temperature can be calculated using a characteristic equation for the particular type of RTD. The manufacturers of RTD's supply the appropriate characteristic equation for each RTD. EQN. 2 is exemplary of a characteristic RTD equation. The value determined by solving EQN. 1 is inserted into EQN. 2 to determine the temperature experienced by temperature sensor 109.

$$\text{Temperature} = [(RTD - 100) * 2.56] + 1.25\left[\frac{((RTD - 100) * 2.56)^2}{8192}\right] \quad \text{(EQN. 2)}$$

$$\frac{(V_{C3} - V_{C2})}{V_{C1} - V_{C0}} * 100\ \Omega = R_{110} + R_c\ (\text{conductor}\,308) \quad \text{(EQN. 3)}$$

Each type of RTD has a unique characteristic equation such as EQN. 2. The above example is for a Heraeus 1PT100FKG 430.4-18-T-3.

This is how known Coriolis flowmeter systems measure the temperature of the flow tube. Note that a conductor 203 is dedicated to the full-time task of providing a means for measuring the resistance ($R_C$) of the cable.

Figure 3:
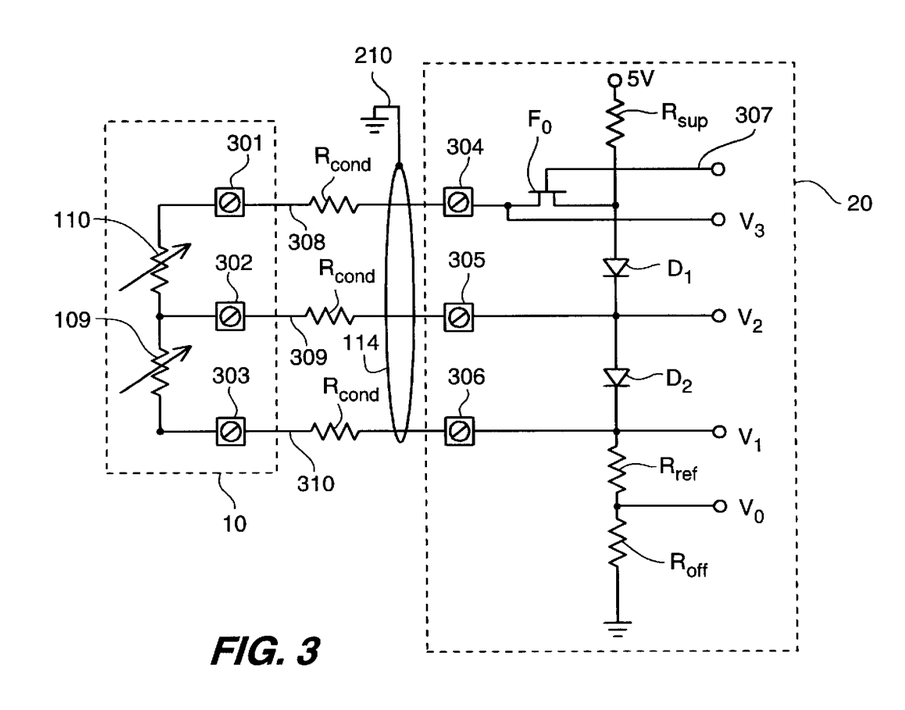
FIG. 3 is a schematic of one example implementation for a dual temperature sensor circuit according to the present invention.

Dual Temperature Sensors—FIG. 3

FIG. 3 illustrates the circuit according to the present invention for measuring the temperature at two locations on a Coriolis mass flowmeter. The circuit of FIG. 3 is similar to the circuit of FIG. 2 except there are two temperature sensors 109–110 and a Field Effect Transistor (FET) $F_0$ for disconnecting temperature sensor 110 from the 5V voltage reference. Note also that voltage $V_3$ is measured from the side of FET $F_0$ connected to temperature sensor 110. Temperature sensors 109–110 have resistances $R_{109}$–$R_{110}$, respectively, which change according to the temperature experienced by each sensor.

Control line 307 is connected to a microprocessor (not shown in FIG. 3) and determines when FET $F_0$ is open and when FET $F_0$ is closed. When FET $F_0$ is closed, current flows from the 5V voltage reference, through FET $F_0$ and conductor 308 (which has resistance Rc), through temperature sensors 110 and 109, and back to transmitter 20 through conductor 310 (which has a resistance $R_C$). The current flow continues through $R_{ref}$ and through $R_{off}$ to ground. $R_{ref}$ is, for purposes of this example, a 100$\Omega$ resistor. When FET $F_0$ is closed, the following calculations are made:

$$\frac{(V_{C2} - V_{C1})}{V_{C1} - V_{C0}} * 100\ \Omega = R_{109} + R_c\ (\text{conductor}\,310) \quad \text{(EQN. 4)}$$

EQN. 3 is used to calculate the resistance of temperature sensor 110 ($R_{110}$) plus the resistance of conductor 308 ($R_C$). EQN. 4 is used to calculate the resistance of temperature sensor 109 and conductor 310 ($R_C$). The results of EQNs. 3 and 4 cannot be plugged directly into EQN. 2 to determine temperatures because the results of EQNs. 3 and 4 each include an amount of resistance equal to cable resistance $R_C$. Periodically a measurement of the conductor resistance Rc is made by opening FET $F_0$ and making measurements and calculations as described below. With FET $F_0$ open, current flows through diode $D_1$, through conductor 309 (having a resistance $R_C$) and temperature sensor 109, and back to ground through conductor 310 (having a resistance $R_C$) reference resistor $R_{ref}$ and offset resistor $R_{off}$. When FET $F_0$ is open, the following calculations are made:

$$\frac{(V_{O2} - V_{O3})}{V_{O1} - V_{OO}} * 100 \, \Omega = R_c \text{ (conductor 309)} \quad \text{(EQN. 5)}$$

$$\frac{(V_{O2} - V_{O1})}{V_{O1} - V_{OO}} * 100 \, \Omega = \quad \text{(EQN. 6)}$$

$$R_{109} + R_c \text{ (conductor 309)} + R_c \text{ (conductor 310)}$$

Since there is no current flowing through temperature sensor 110 when FET $F_0$ is open, the voltage ($V_2-V_3$) represents a voltage drop due only to current flow through conductor 309 having a resistance $R_C$. When this voltage is divided by the voltage across reference resistor $R_{ref}$ and the result is multiplied by the value of the reference resistor $R_{ref}$ (100Ω) the value of resistance $R_C$ is obtained. As noted above, conductors 308–310 are all of substantially equal length and gauge and are all subject to the same temperature thus an assumption is made that the measured resistance of one of the conductors is equal to the resistance of each of the remaining conductors. In one embodiment of the present invention, the result of EQN. 5 is subtracted from the results of EQNs 3 and 4 to determine the resistance of temperature sensor 110 and temperature sensor 109, respectively. Those values are then inserted, one at a time, as the 'RTD' value in EQN. 2 to determine the temperature experienced by each of the temperature sensors.

In another embodiment of the present invention a further calculation is made to provide a second estimate of $R_C$ and the two values of $R_C$ are averaged together to determine an $R_C$ value used as described above. The result of EQN. 4 is subtracted from the result of EQN. 6 leaving an estimate of the resistance of conductor 109 ($R_C$). Thus, in this embodiment $R_C$ is calculated as follows:

$$\frac{(\text{EQN. 6} - \text{EQN. 4}) + \text{EQN. 5}}{2} = R_c \quad \text{(EQN. 7)}$$

This method of determining the resistance $R_C$ is more accurate than simply using the result of EQN. 5 because EQN. 7 uses an average of two different measures of the resistance of conductor 109. This averaged value of $R_C$ obtained from EQN. 7 is then subtracted from EQNs. 3 and 4 to obtain the resistance values for temperature sensors 110 and 109, respectively.

Figure 4:
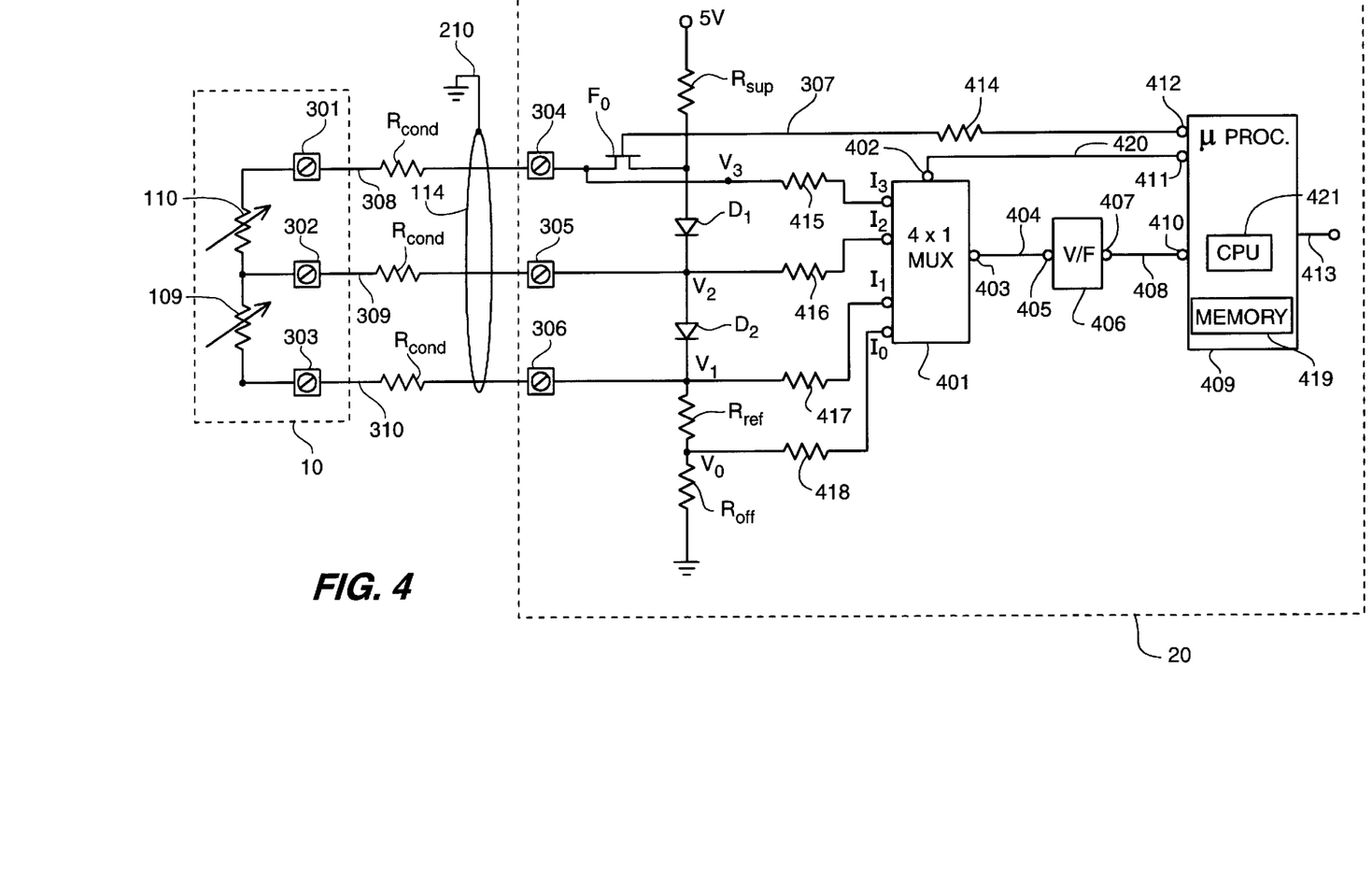
FIG. 4 is a more detailed schematic for a dual temperature sensor according to the present invention.
Figure 5:
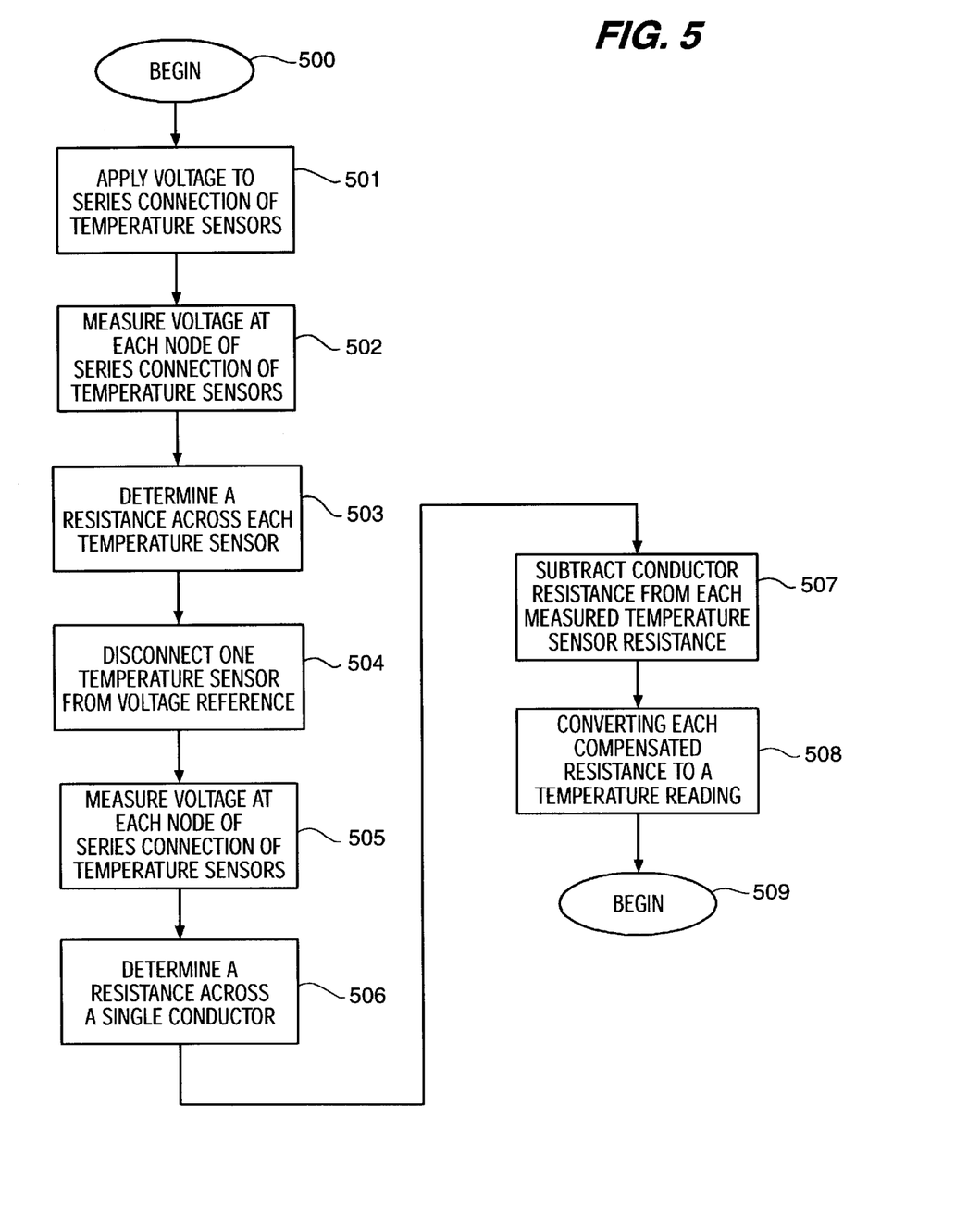
FIG. 5 is a flowchart depicting the processing steps controlled by a microprocessor to determine the temperature of multiple temperature sensors according to the present invention.

Dual Temperature Sensors and Transmitter 20—
FIGS. 4–5

Elements common between the FIGS. are referenced with common reference numerals. FIG. 4 illustrates the circuit of FIG. 3 in combination with the necessary supporting and controlling circuitry of transmitter 20. Control line 307 which controls the operation of FET $F_0$ is connected to control output 412 of microprocessor 409. Microprocessor 409 is configured to periodically switch FET $F_0$ open as described above. In one embodiment of the present invention FET $F_0$ is switched open for approximately 0.8 seconds every 10 minutes in order to make the necessary measurement of $R_C$. FET $F_0$ is representative of a switching device. Those skilled in the art recognize that any suitable switching device such as but not limited to a transistor could be used in place of FET $F_0$. Buffer resistors 414–418 ensure that the circuitry of transmitter 20 does not itself effect the resistance measurements of temperature sensors 109–110. In one embodiment resistors 414–418 have values of 10KΩ and resistors $R_{sup}$, $R_{ref}$ and $R_{off}$ have values of 1.74KΩ, 100Ω and 3.01KΩ, respectively. Reference resistor Rref is highly accurate, for example, to within 0.1% and 10 parts per million per degree C.

The four voltages $V_0-V_3$ are read at inputs $I_0-I_3$, respectively, of multiplexer 401. Multiplexer 401 switches between inputs $I_0-I_3$ to produce one of voltages $V_0-V_3$ at a time at output 403. The voltage level on output 403 is transmitted over line 404 to voltage to frequency converter ("V/F") 406. V/F 406 converts a voltage input at input 405 to a corresponding frequency output at output 407. The frequency at output 407 is transmitted over line 408 to microprocessor 409 and read at frequency input 410 of microprocessor 409. The operation of multiplexer 401 is controlled by a signal over path 420 from control output 411 of microprocessor 409 to provide each of voltages $V_0-V_3$ in succession at output 403. Microprocessor 409 receives the frequency representing each voltage measurement at input 410 and stores a value for each frequency in memory 419. Central Processing Unit ("CPU") 421 then uses the values stored in memory 419 to compute all of EQNs. 3–7 to produce an output over path 413 for the temperature experienced by temperature sensor 109 and the temperature experienced by temperature sensor 110. Microprocessor 409 is one of any commercially available microprocessor such as the MC68HC7O5C9A-CFN manufactured by Motorola. The operation of such microprocessors to perform the above-described tasks and calculations is well known to those skilled in the art.

FIG. 5 is a flowchart illustrating the process steps executed by microprocessor 409 to produce temperature values for temperature sensors 109–110. Processing begins at element 500 and proceeds to step 501. During step 501 a voltage reference is applied to the series connection of multiple temperature sensors. With reference to FIG. 4, the 5V voltage reference is turned on, if not already on, and FET $F_0$ is closed during step 501. Processing then proceeds to step 502.

During step 502 the voltage is measured at each node of the series connection of temperature sensors. For example, a suitable control signal is sent to control input 402 of multiplexer 401 to successively switch voltages $V_{c0}-V_{c3}$ to V/F 406. As described above with respect to FIG. 4, microprocessor 409 counts the frequency corresponding to each of voltages $V_{c0}-V_{c3}$ and stores an appropriate value in memory 419. Processing next proceeds to step 503.

During step 503 the resistance across each temperature sensor is determined. Of course, with the measurements accomplished so far, the resistance across each temperature sensor also includes the resistance of the conductor over which the necessary voltages are measured. The calculations performed during step 503 correspond to EQNs. 3 and 4, described above. Processing next continues to step 504.

During step 504, a switch is opened to remove one end of the series connection of temperature sensors from the voltage reference. With reference to the circuit of FIG. 4, $F_0$ is opened in response to a control signal over path 307 from control output 412 of microprocessor 409. Processing then continues to step 505.

During step 505 the voltage is measured at each node of the series connection of temperature sensors. For example, a suitable control signal is sent to control input 402 of multiplexer 401 to successively switch voltages $V_{c0}$–$V_{o3}$ to V/F 406. As described above with respect to FIG. 4, microprocessor 409 counts the frequency corresponding to each of voltages $V_{o0}$–$V_{o3}$ and stores an appropriate value in memory 419. Processing next proceeds to step 506.

During step 506 the resistance across one of the conductors is measured to allow for the subsequent compensation for conductor resistance. In the example of FIG. 4, the resistance of conductor determined using either the calculation of EQN. 5 alone or the calculations of FIGS. 5–6 to determine an averaged amount for Rc. Processing then continues to step 507.

During step 507 the value of $R_C$ calculated during step 506 is subtracted from temperature sensor resistances calculated during step 503. This step generates a the compensated resistance value for each serially connected temperature sensor. Processing then proceeds to step 508.

During step 508 each of the compensated sensor resistance values is converted to a temperature using, for example, a characteristic equation such as EQN. 2. The form of EQN. 2 is dependant upon the actual temperature sensor model and is supplied by the temperature sensor manufacturer. Processing then concludes with element 509.

Figure 6:
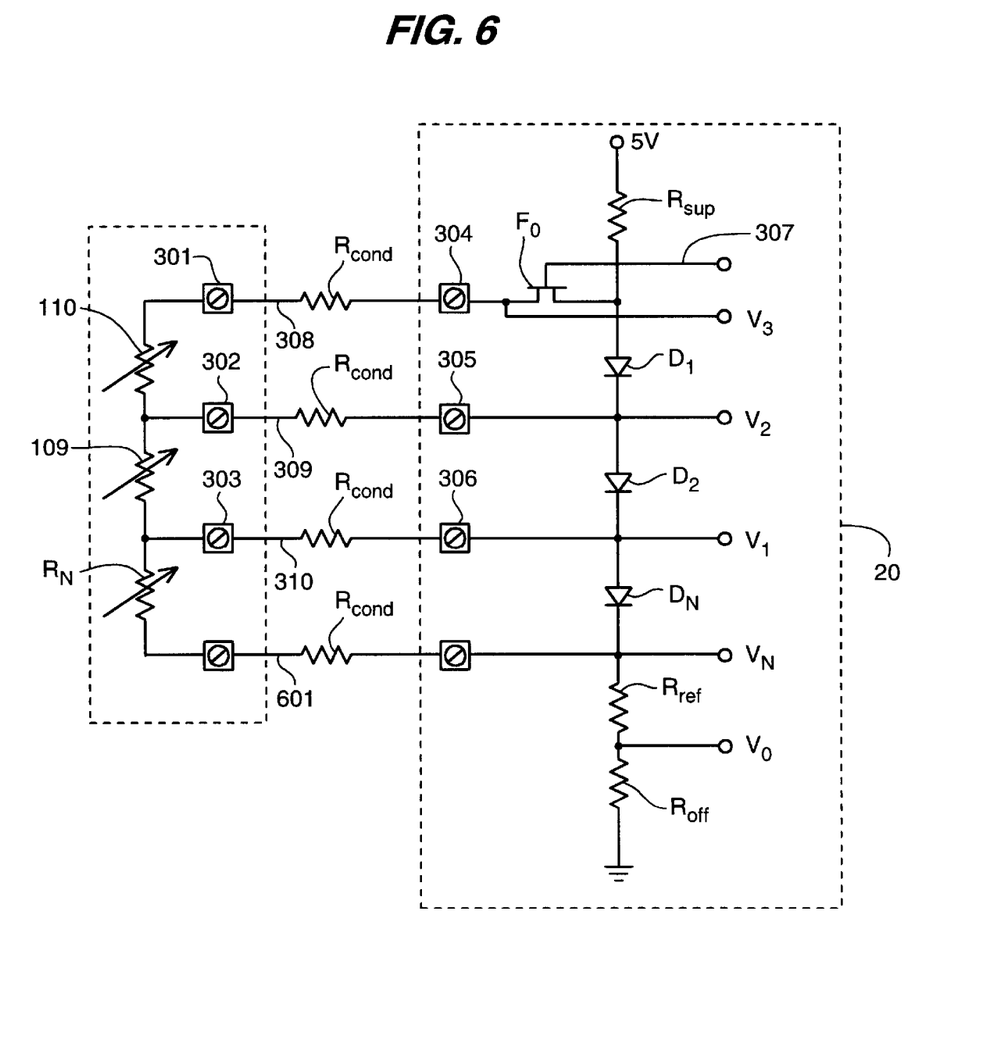
FIG. 6 is a schematic for a temperature sensor circuit according to the present invention that employs three temperature sensors.

N-Temperature Sensors—FIG. 6

FIG. 6 depicts a circuit utilizing a third temperature sensor $R_N$ which is connected to transmitter 20 through a conductor 601 having a resistance $R_C$. $R_N$ could be, for example, a temperature sensor mounted to case 106 in FIG. 1. With FET $F_0$ closed, the voltages $V_{c0}$–$V_{c3}$ and $V_{CN}$ are measured. The following calculations are then made to determine the resistances across the temperature sensors and conductors:

$$\frac{(V_{C3} - V_{C2})}{V_{CN} - V_{C0}} * 100 \, \Omega = R_{110} + R_c \text{ (conductor 308)} \quad \text{(EQN. 8)}$$

$$\frac{(V_{C2} - V_{C1})}{V_{CN} - V_{C0}} * 100 \, \Omega = R_{109} \quad \text{(EQN. 9)}$$

$$\frac{(V_{C1} - V_{CN})}{V_{CN} - V_{C0}} * 100 \, \Omega = R_N + R_c \text{ (conductor 601)} \quad \text{(EQN. 10)}$$

Note that in the case of EQN. 10, the resistance of temperature sensor 109 is measured directly without any conductor resistance component. However, in order to determine the resistances of temperature sensor 110 and temperature sensor $R_N$, further processing is necessary. FET $F_0$ is opened with a control signal over path 307. The voltages $V_{o0}$–$V_{o3}$ and $V_{oN}$ are measured and the following calculations are made to determine the conductor resistance $R_C$:

$$\frac{(V_{O2} - V_{O3})}{V_{ON} - V_{O0}} * 100 \, \Omega = R_c \text{ (conductor 309)} \quad \text{(EQN. 11)}$$

EQN. 11 provides a direct measure of the resistance $R_C$ of conductor 309. As described above, an averaged value of conductor resistance, $R_{avg}$, can be obtained with further calculations as follows:

$$\frac{(V_{O2} - V_{O1})}{V_{ON} - V_{O0}} * 100 \, \Omega = R_c \text{ (conductor 309)} + R_{109} \quad \text{(EQN. 12)}$$

$$\left( \frac{\text{EQN. 12} - \text{EQN. 9} + \text{EQN. 11}}{2} \right) = R_{avg} \quad \text{(EQN. 13)}$$

EQN. 12 includes the resistance of the temperature sensor $R_{109}$. Thus an averaged value, $R_{avg}$, for the resistance of conductor 309 is obtained. As noted above, it is assumed that each of conductors 308–310 and 601 have the same resistance since they are of substantially the same length and gauge and experience substantially the same temperature. $R_{avg}$ is then subtracted from EQN. 8 and EQN. 10 to obtain the compensated values for R110 and $R_N$, respectively. As noted $R_{109}$ is measured directly.

FIG. 6 and the associated calculations of EQNs. 8–13 illustrate that the present invention is applicable to any number temperature sensors by arranging the N sensors in series and providing a switch for disconnecting one of the sensors from the voltage supply to provide a measure of conductor resistance.

Although the present invention has been described in terms of resistive temperature sensors, those skilled in the art recognize that any type of resistive sensor could be used in place of a temperature sensor. For example, one might use a strain gauge which indicates strain in the form of a variable resistance in place of one or more of the temperature sensors described herein. The present invention can be applied using any sensor that indicates a condition by changing its resistance. The essence of the present invention applies equally to any such a configuration.

It is to be expressly understood that the claimed invention is not to be limited to the description of the preferred embodiment but encompasses other modifications and alterations within the scope and spirit of the inventive concept.

We claim:

1. A circuit for minimizing the number of conductors between a transmitter and multiple resistive sensors, comprising:

n resistive sensors connected in a series having a first end and a second end;

n+1 conductors connecting said series of said n resistive sensors to said transmitter, wherein a first one of said n+1 conductors connects said transmitter to said first end of said series, a second one of said n+1 conductors connects said series to ground through a reference resistor at said transmitter and each remaining said n+1 conductors connects nodes between said n resistive sensors to said transmitter;

switching means in said transmitter connected to said first one of said n+1 conductors to disconnect and connect said series of said n resistive sensors to a voltage supply;

cable resistance measurement means connected to said first end of said sensor series for measuring a conductor resistance of said first one of said n+1 conductors;

means connected to said n+1 conductors for measuring a condition-indicative resistance across each of said n resistive sensors; and means for determining a cable resistance-compensated condition experienced by each of said n resistive sensors, responsive to said cable resistance measurement means and said condition-indicative measurement means.

2. The circuit of claim 1 wherein said cable resistance measurement means includes:

a timing means for periodically opening said switching means to disconnect said voltage supply from said first end of said series;

a one of said remaining n+1 conductors connected at a first end to a first node between two of said n resistive sensors and at a second end to said transmitter;

means for measuring a cable voltage between said first end of said series and said second end of said one of said remaining ones of said n+1 conductors responsive to said series being disconnected from said voltage supply;

means for measuring a reference voltage across said reference resistor; and means for comparing said cable voltage to said reference voltage to determine said conductor resistance.

3. The circuit of claim 2 wherein said comparing means includes:

means for dividing said cable voltage by said reference voltage to produce a voltage ratio; and means for multiplying said voltage ratio by a reference value wherein said reference value is the value in ohms of said reference resistor.

4. The circuit of claim 3 wherein said reference value is 100 ohms.

5. The circuit of claim 2 wherein said means for measuring said condition-indicative resistance includes:

means for measuring a first sensor voltage between said switching means and a second end of said one of said remaining ones of said n+1 conductors;

means for measuring a reference voltage across said reference resistor; and means for comparing said first sensor voltage to said reference voltage to determine a first sensor resistance wherein said first sensor resistance includes the resistance of a first one of said n resistive sensors and the resistance of said first one of said n+1 conductors.

6. The circuit of claim 5 wherein said means for comparing said first sensor voltage to said reference voltage includes:

means for dividing said first sensor voltage by said reference voltage to produce a first sensor voltage ratio; and means for multiplying said first sensor voltage ratio by a reference value wherein said reference value is the value in ohms of said reference resistor.

7. The circuit of claim 6 wherein said reference value is 100 ohms.

8. The circuit of claim 6 wherein said condition-indicative measurement means includes:

means for measuring a second sensor voltage between said second end of said one of said remaining n+1 conductors and said second end of said second one of said n+1 conductors;

means for measuring a reference voltage across said reference resistor; and means for comparing said second sensor voltage to said reference voltage to determine a second sensor resistance wherein said second sensor resistance includes the resistance of a second one of said n resistive sensors and the resistance of said second one of said n+1 conductors.

9. The circuit of claim 8 wherein said means for comparing said second sensor voltage to said reference voltage includes:

means for dividing said second sensor voltage by said reference voltage to produce a second sensor voltage ratio; and means for multiplying said second sensor voltage ratio by a reference value wherein said reference value is the value in ohms of said reference resistor.

10. The circuit of claim 9 wherein said reference value is 100 ohms.

11. The circuit of claim 8 wherein said means for determining said cable resistance-compensated condition includes:

first subtracting means for subtracting said conductor resistance from said first sensor resistance to determine a first sensor compensated resistance;

second subtracting means for subtracting said conductor resistance from said second sensor resistance to determine a second sensor compensated resistance;

means for converting said first sensor compensated resistance and said second sensor compensated resistance to a first condition and a second condition, respectively.

12. The circuit of claim 5 wherein said comparing means includes:

means for measuring a first voltage between said second end of said one of said remaining n+1 conductors and an end of said second one of said n+1 conductors responsive to said series being disconnected from said voltage supply;

means for measuring a first reference voltage across said reference resistor responsive to said series being disconnected from said voltage supply;

means for comparing said first voltage to said first reference voltage to determine a first sensor resistance wherein said first sensor resistance includes the resistance of a one of said n resistive sensors and the resistance of said said remaining one of said n+1 conductors and the resistance of said second one of said n+1 conductors;

means for measuring a second voltage between said second end of said one of said remaining n+1 conductors and said end of said second one of said n+1 conductors responsive to said series being connected to said voltage supply;

means for measuring a second reference voltage across said reference resistor responsive to said series being connected to said voltage supply;

means for comparing said second voltage to said second reference voltage to determine a second sensor resistance wherein said second sensor resistance includes the resistance of said one of said n resistive sensors and the resistance of said second one of said n+1 conductors, means, responsive to said first sensor resistance and said second sensor resistance and said conductor resistance for calculating an average conductor resistance.

13. The circuit of claim 12 wherein said means for calculating said average conductive resistance includes:

means for subtracting said second sensor resistance from said first sensor resistance to generate an estimated conductor resistance;

means for adding said conductor resistance to said estimated conductor resistance and dividing by two to obtain said average conductor resistance.

14. The circuit of claim 1 wherein one of said resistive sensors is a resistive temperature sensor and said condition is temperature.

15. A method for minimizing the number of conductors between a transmitter and n resistive sensors connected in series on a flowmeter element, comprising the steps of:

applying a voltage to a series of n resistive sensors;

measuring a voltage at nodes at an output of each of said n resistive sensors connected in series;

determining, responsive to said step of measuring said voltages at said node, a voltage across each of said n resistive sensors;

comparing each said voltage across each of said n resistive sensors to a reference voltage across a reference resistor to obtain a sensor resistance for each of said n resistive sensors;

disconnecting a one of said n resistive sensors from said applied voltage;

measuring a conductor voltage across a first conductor connected to said one of said n resistive sensors;

comparing said conductor voltage to a second reference voltage across said reference resistor to obtain a conductor resistance for said first conductor;

subtracting said conductor resistance from each said sensor resistance obtained for said n resistive sensors to obtain a compensated resistance for each of said n resistive sensors; and converting each said compensated resistance to multiple condition readings wherein each of said condition readings is associated with one of said n resistive sensors.

* * * * *